United States Patent
Dabic et al.

(10) Patent No.: US 10,509,471 B2
(45) Date of Patent: Dec. 17, 2019

(54) DEVICE AND METHOD FOR HAPTIC FEEDBACK FOR AUTOMOTIVE VEHICLE

(71) Applicant: DAV, Créteil (FR)

(72) Inventors: Stéphanie Dabic, Créteil (FR); Nour-Eddine El-Ouardi, Créteil (FR)

(73) Assignee: DAV, Créteil (FR)

( * ) Notice: Subject to any disclaimer, the term of this patent is extended or adjusted under 35 U.S.C. 154(b) by 0 days.

(21) Appl. No.: 15/533,850

(22) PCT Filed: Dec. 14, 2015

(86) PCT No.: PCT/FR2015/053478
§ 371 (c)(1),
(2) Date: Jun. 7, 2017

(87) PCT Pub. No.: WO2016/097561
PCT Pub. Date: Jun. 23, 2016

(65) Prior Publication Data
US 2017/0329406 A1     Nov. 16, 2017

(30) Foreign Application Priority Data
Dec. 15, 2014   (FR) ...................................... 14 02858

(51) Int. Cl.
*G06F 3/01* (2006.01)
*B60K 37/06* (2006.01)
*G06F 3/042* (2006.01)

(52) U.S. Cl.
CPC ............... *G06F 3/016* (2013.01); *B60K 37/06* (2013.01); *G06F 3/0421* (2013.01); *B60K 2370/143* (2019.05); *G06F 2203/014* (2013.01)

(58) Field of Classification Search
CPC ............... G06F 3/016; G06F 2203/014; B60K 2350/1024–1036
See application file for complete search history.

(56) References Cited

U.S. PATENT DOCUMENTS

| 2005/0122317 A1 | 6/2005 | Schaaf et al. |
| 2009/0146533 A1* | 6/2009 | Leskinen ................. G01L 1/16 310/338 |

(Continued)

FOREIGN PATENT DOCUMENTS

| DE | 10 2011 018897 A1 | 10/2012 | |
| DE | 102011018897 A1 * | 10/2012 | ............. G06F 3/016 |

(Continued)

OTHER PUBLICATIONS

International Search Report issued in PCT/FR2015/053478 dated Feb. 12, 2016 (3 pages).

(Continued)

*Primary Examiner* — Laurence J Lee
(74) *Attorney, Agent, or Firm* — Osha Liang LLP

(57) ABSTRACT

A control device for an automotive vehicle has a touch surface with a plate bearing a contact sensor that detects contact of a finger of a user, a haptic feedback module that vibrates the touch surface, which includes actuators positioned below the touch surface and linked to the plate of the touch surface, and a driver unit configured to drive the haptic feedback module to generate haptic feedback in response to a press on the touch surface. The haptic feedback is composed of a vibratory signal produced by control signals including one or more succession of pulses sent to the actuators, wherein each of the plurality of control signals generates one individual haptic pattern, a repetition of at least two identical individual haptic patterns, generated successively, and a period with no haptic feedback between two successive individual haptic patterns. A method of control of such a device is also disclosed.

17 Claims, 1 Drawing Sheet

(56) References Cited

U.S. PATENT DOCUMENTS

| | | | |
|---|---|---|---|
| 2010/0309142 A1* | 12/2010 | Cruz-Hernandez | G06F 3/016 345/173 |
| 2012/0162114 A1* | 6/2012 | Inoue | G06F 3/016 345/173 |
| 2014/0267065 A1* | 9/2014 | Levesque | G06F 3/016 345/173 |
| 2014/0282051 A1* | 9/2014 | Cruz-Hernandez | G06F 3/0414 715/744 |
| 2014/0292668 A1 | 10/2014 | Fricklas et al. | |
| 2014/0354570 A1* | 12/2014 | Makinen | G06F 3/041 345/173 |
| 2015/0097791 A1* | 4/2015 | Lisseman | B62D 1/04 345/173 |

FOREIGN PATENT DOCUMENTS

| | | |
|---|---|---|
| EP | 2 264 572 A2 | 12/2010 |
| EP | 2 733 576 A1 | 5/2014 |

OTHER PUBLICATIONS

Written Opinion of the International Searching Authority issued in PCT/FR2015/053478 dated Feb. 12, 2016 (8 pages).

* cited by examiner

DEVICE AND METHOD FOR HAPTIC FEEDBACK FOR AUTOMOTIVE VEHICLE

The present invention relates to a control device and method for an automotive vehicle.

In the last few years, cars have become easier to drive with the appearance of new emerging technologies (for example power steering, ABS, cruise control, parking sensors, etc.). Paradoxically however, the number of functions to be controlled while driving has also greatly increased. This may create a certain complexity relating to unfamiliarity with the use of these functionalities and their diversity. The car has become a veritable living space, regarded as an interconnected personal communication center with, for example, an MP3 player, GPS and link to mobile phones.

The introduction of these new functions has resulted in an increase in the number of buttons on the instrument panel of a car's passenger compartment. However, the number of buttons cannot increase indefinitely, in particular because of the resulting complexity, space limitations, accessibility or cognitive load. In addition, the interaction of the driver with on-board systems in the car may create a situation of attentional overload in which the driver cannot optimally process all of the information related to the task of driving, leading to mistakes and overly long detection times.

One possibility is to centralize the buttons by replacing them with a touch surface. This makes it possible to continue to increase the number of functions, the latter becoming programmable and reconfigurable and being displayed temporarily or permanently depending on the context or the activated function. The touch surface thus enables multi-functionality, while virtualizing the buttons and being personalizable.

However, unlike the case of a push-button, when the driver interacts with a touch surface he or she receives no feedback related directly to his or her action on the interface, other than the simple contact of his finger pressing against the surface.

In order to compensate for the loss of information caused by the replacement of conventional mechanical interfaces with touch surfaces, provision is made to add a stimulus, such as a haptic stimulus, to provide feedback from the system to the user. This stimulus makes it possible to avoid ambiguity as to whether the action of the user has been registered by the system, which ambiguity is liable to increase the likelihood of dangerous situations occurring. However, it is furthermore necessary to avoid overloading the driver's visual and auditory pathways, which are already greatly taxed by the driving task. Specifically, the use of touch surfaces in an automotive vehicle must not distract the driver.

One aim of the present invention is to provide a control device which does not interfere with driving, which is easily perceived and understood by users, and which may be distinguished from other signals.

To this end, one subject of the present invention is a control device for an automotive vehicle including:
a touch surface intended to detect contact of a finger of a user; and
a haptic feedback module configured to vibrate the touch surface;
characterized in that it includes a driver unit configured to drive the haptic feedback module in order to generate haptic feedback in response to pressing on the touch surface, the haptic feedback consisting of:
the repetition of at least two identical individual haptic patterns, generated in succession; and
a period without haptic feedback, intercalated between two successive individual haptic patterns.

The periods without haptic feedback for which there is no perceptible movement of the touch surface make it possible to produce particular effects, such as the illusion that the touch surface has a direction in which the user should slide his or her finger or the illusion that the finger depresses the touch surface.

According to one or more of the features of the control device, either alone or in combination:
the control device includes a display device positioned below the touch surface in order to display a graphical element through the touch surface and the driver unit is configured to drive the haptic feedback module in order to generate haptic feedback in response to pressing in the area of the graphical element; The user is thus provided with an indication as to the function that may be enabled through the interaction with the touched graphical element;
the duration of a period without haptic feedback is between 10 and 240 milliseconds;
the peak-to-peak value of the acceleration of the individual haptic patterns is between 0.5 G and 15 G;
the frequency of the individual haptic patterns is between 60 Hz and 400 Hz;
the haptic feedback is generated for as long as the finger is in contact with the touch surface. It is possible to use this effect for as long as the finger is in contact with a graphical element of the display device to simulate holding the graphical element while moving it around the screen.

According to one exemplary embodiment:
the duration of an individual haptic pattern is between 20 and 250 milliseconds;
the peak-to-peak value of the acceleration of the individual haptic patterns is between 1 G and 4 G; and
the inter-command duration between the start of a control signal generating an individual haptic pattern and the start of a subsequent control signal is between 20 and 150 milliseconds.

Provision may also be made for:
the individual haptic pattern to be repeated a minimum of three times; and
the haptic feedback to be generated for a predefined duration that is longer than or equal to 50 milliseconds.

These haptic feedback characteristics make it possible to provide the sensation of depressing the touch surface (along Z). The user has the impression that his or her finger passes into the touch surface further than the small physical movement actually achieved. It is possible to use this effect to simulate the actuation of a push-button, corresponding to a long pressing action.

According to another exemplary embodiment:
the individual haptic pattern is repeated between three and 10 times;
the peak-to-peak value of the acceleration of the individual haptic patterns is between 3 G and 10 G;
the inter-command duration between the start of a control signal generating an individual haptic pattern and the start of a subsequent control signal is longer than or equal to 20 milliseconds; and
the haptic feedback is generated for a predefined duration that is longer than or equal to 50 milliseconds.

This makes it possible to indicate to the user that he or she is performing a forbidden interaction, making an error or performing an impossible action.

Another subject of the invention is a control method for controlling a device as described above, in which haptic feedback that vibrates the touch surface of the control device is generated in response to pressing the touch surface, the haptic feedback consisting of:

- the repetition of at least two identical individual haptic patterns, generated in succession; and
- a period without haptic feedback, intercalated between two successive individual haptic patterns.

According to one or more features of the control method, either alone or in combination:

- a graphical element is displayed through the touch surface and haptic feedback is generated in response to pressing in the area of the graphical element;
- the duration of a period without haptic feedback is between 10 and 240 milliseconds;
- the peak-to-peak value of the acceleration of the individual haptic patterns is between 0.5 G and 15 G;
- the frequency of the individual haptic patterns is between 60 Hz and 400 Hz;
- the haptic feedback is generated for as long as the finger is in contact with the touch surface.

BRIEF DESCRIPTION OF THE DRAWINGS

Other advantages and features will become apparent upon reading the description of the invention and in the appended figures which show a non-limiting exemplary embodiment of the invention, in which.

In these figures, the same elements bear the same reference numbers.

DETAILED DESCRIPTION

Figure 1:
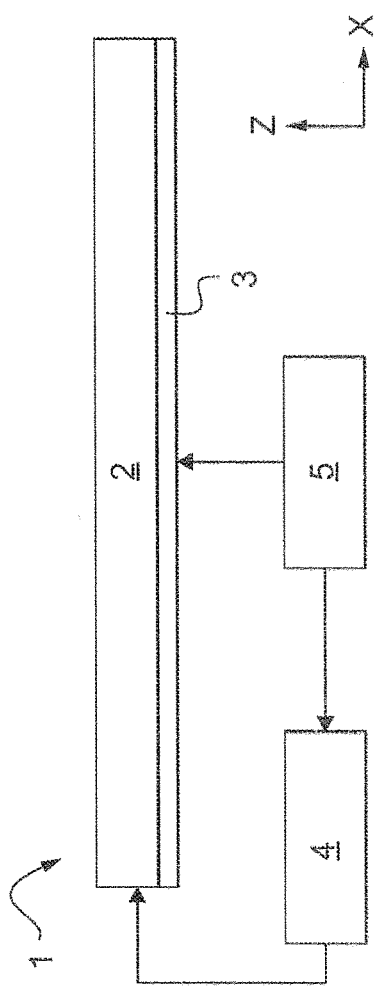
FIG. 1 shows an exemplary control device for an automotive vehicle.

FIG. 1 shows a control device 1 for an automotive vehicle, for example mounted in the instrument panel or in a center console of the vehicle, for controlling on-board systems of the vehicle such as the air-conditioning, radio, music, phone, ventilation or navigation systems.

The control device 1 includes a touch surface 2 and a haptic feedback module 4 configured to vibrate the touch surface 2. The term "haptic" refers to feedback by touch. Thus, haptic feedback is a vibratory or vibrotactile signal.

The touch surface 2 is intended to detect contact on the touch surface 2 by a finger of a user or any other activation means (for example a stylus) of a user having for example modified or selected a command.

The control device 1 may include a display device 3 positioned below the touch surface 2 in order to display a graphical element through the touch surface 2, which is then transparent, thus forming a touchscreen, for example.

A touchscreen is an input peripheral device enabling users of a system to interact therewith by virtue of touch. It allows the user to interact directly with the area that he or she wants to select for various purposes such as, for example, the selection of a destination address or of a name in a directory, the settings of the air-conditioning system, the activation of a dedicated function, the selection of a track from a list or, in general, scrolling through a list of choices, selection, validation, and errors.

The touch surface 2 includes a plate bearing a contact sensor for detecting a push pressure or a movement of the finger or of a stylus of the user.

The contact sensor is, for example, a pressure sensor, such as one using FSR (force-sensing resistor) technology, i.e. using pressure-sensitive resistors. FSR technology exhibits a very high level of strength and robustness, while having high resolution. Furthermore, it is highly reactive and accurate, while being relatively stable over time. It can have a fairly long life, and can be used with any type of activation means, at a relatively low cost.

According to one FSR technology design, the sensor operates by bringing two conductive layers into contact, for example through the action of the finger. One of the embodiments consists in covering a glass plate with a layer of conductive ink, on which a sheet of flexible polyester is superposed, which is itself covered on its inner face by a layer of conductive ink. Transparent, insulating blocks insulate the plate from the polyester sheet. Activation on the touch surface causes a slight depression of the polyester layer, which comes into contact with the conductive layer of the glass plate. The local contact of the two conductive layers results in a change in the electrical current applied to the plate, corresponding to a voltage gradient.

According to another example, the contact sensor comprises flexible semiconductive layers sandwiched between, for example, a conductive layer and a resistive layer. By exerting a pressure or a dragging action on the FSR layer, its ohmic resistance decreases, thus making it possible, through the application of a suitable voltage, to measure the pressure applied and/or the location of the point where the pressure is exerted.

According to another example, the contact sensor is based on capacitive technology.

The haptic feedback module 4 includes at least one actuator, linked to the plate of the touch surface 2, in order to generate haptic feedback as a function of a signal from the contact sensor. The haptic feedback is a vibratory signal such as a vibration produced by a sinusoidal control signal or by a control signal S1, S2, S3 . . . Sn, including a pulse or a succession of pulses, sent to the actuator. The vibration is for example directed along the plane of the touch surface 2 or orthogonally to the plane of the touch surface 2, in the Z-direction, or even directed along a combination of these two directions.

In the case of a plurality of actuators, these are arranged below the touch surface 2, in various positions (at the center or to one side) or in various orientations (in the direction of pressing on the surface or along another axis).

According to one exemplary embodiment, the actuator is based on a technology akin to loudspeaker (voice coil) technology. It comprises a fixed part and a part that is able to move translationally within an air gap of the fixed part, for example of the order of 200 μm, between a first position and a second position, parallel to a longitudinal axis of the moving part. The moving part is, for example, formed by a moving magnet sliding inside a fixed coil or by a moving coil sliding around a fixed magnet, the moving part and the fixed part interacting through electromagnetic effect. The moving parts are linked to the plate in such a way that the movement of the moving parts generates the translational movement of the plate in order to generate the haptic feedback provided to the finger of the user. This technology is easy to control and allows substantial masses, like that of a screen, to be moved at various frequencies and meets the very strict constraints for automotive vehicles, namely low cost, high resistance to large temperature variations, and ease of installation.

The control device 1 additionally includes a driver unit 5 configured to drive the haptic feedback module 4 in order to generate haptic feedback in response to pressing on the touch surface 2.

The touch surface 2 is being pressed for as long as the finger remains in contact with the touch surface 2. When the user removes his or her finger and then presses the touch surface 2 once more, haptic feedback is generated anew. Haptic feedback is thus generated for each press.

The haptic feedback consists of the repetition of at least two identical individual haptic patterns M1, M2, M3 . . . Mn, generated in succession, and of a period without haptic feedback B1, B2 intercalated between two successive individual haptic patterns M1, M2, M3 . . . Mn.

To achieve this, the driver unit 5 sends control signals S1, S2, S3 . . . Sn to the haptic feedback module 4 including, for example, a control pulse sent to the actuator, for example in the form of a square, triangle or sine wave.

Each control signal S1, S2, S3 . . . Sn generates one individual haptic pattern.

Figure 2:
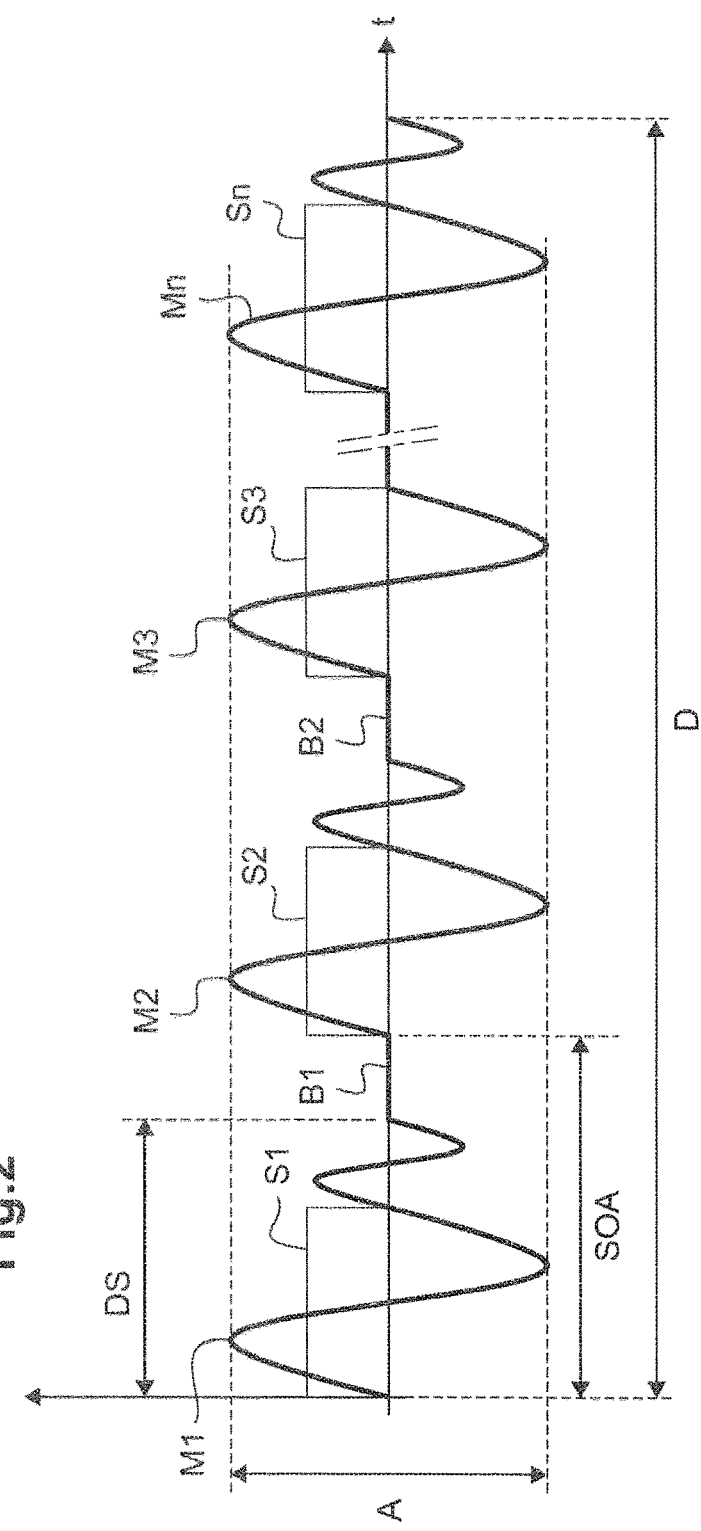
FIG. 2 shows a curve representing the acceleration of the touch surface as a function of time for an example of haptic feedback.

FIG. 2 shows an example of haptic feedback, illustrated by the measurement of the acceleration of the touch surface 2 along Z, in a direction parallel to the direction of pressing the finger on the touch surface 2. The acceleration value measured for the individual haptic patterns M1, M2, M3 . . . Mn generally takes the form of a damped sine wave. The same illustration may be obtained by measuring the movement of the touch surface 2 along Z.

The individual haptic patterns M1, M2, M3 . . . Mn are identical, or substantially identical. Stated otherwise, the individual haptic patterns M1, M2, M3 . . . Mn may differ slightly from one another within a margin of tolerance in which the differences are not perceptible, i.e. the individual haptic patterns M1, M2, M3 are perceived by the user as being identical. The identity of the individual haptic patterns M1, M2, M3 . . . Mn pertains in particular to the aspect (such as taking the form of a damped sine wave), the frequency, the phase shift, the amplitude and the duration. The aspect may, for example, be identified by the response time taken to reach 100% maximum amplitude. The tolerance range applies, for example, to these parameters. By way of example, the individual haptic patterns M1, M2, M3 . . . Mn include an identical response time taken to reach 100% maximum amplitude +/−5 milliseconds, one and the same frequency +/−15%, one and the same amplitude of acceleration +/−1 G for an amplitude of acceleration of between 0.5 G and 7 G, one and the same amplitude of acceleration +/−2 G for an amplitude of acceleration of between 7 G and 15 G, one and the same duration +/−15 milliseconds for a duration of between 20 milliseconds and 100 milliseconds and/or one and the same duration +/−30 milliseconds for a duration of between 100 and 250 milliseconds.

The peak-to-peak value of the acceleration A of the individual haptic patterns M1, M2, M3 . . . Mn is, for example, between 0.5 G and 15 G.

The frequency of the individual haptic patterns M1, M2, M3 . . . Mn is, for example, between 60 Hz and 400 Hz.

At the end of the acceleration and/or of the movement of the touch surface 2, for example when the peak-to-peak value of the acceleration A is lower than 1 G, a period without haptic feedback B1, during which there is no perceptible movement of the touch surface 2, begins.

A period without haptic feedback B1, B2 is a period for which no acceleration or movement of the touch surface 2 is perceived, since it is zero or smaller than the vibrations of the moving vehicle. It is, for example, an acceleration that is smaller than 1 G.

The duration of a period without haptic feedback B1, B2 is, for example, between 10 and 240 milliseconds. The periods without haptic feedback B1, B2 repeated between the individual haptic patterns M1, M2, M3 Mn may or may not be identical.

According to one exemplary embodiment, the end of a period without haptic feedback B1, B2 is managed by controlling the inter-command duration SOA between the start of a control signal S1 generating an individual haptic pattern M1 and the start of a subsequent control signal S2.

According to another example, the duration of a period without haptic feedback B1, B2 is determined, for example, by measuring the duration from which the measured acceleration is smaller than a predetermined threshold.

The periods without haptic feedback B1, B2 for which there is no perceptible movement of the touch surface 2 make it possible to produce particular effects, such as the illusion that the touch surface 2 has a direction in which the user should slide his or her finger or the illusion that the finger depresses the touch surface 2.

Haptic feedback may be generated for a predefined duration D or for as long as the finger is in contact with the touch surface 2.

For example and as shown in FIG. 2:
the individual haptic pattern M1, M2, M3 . . . Mn is repeated a minimum of three times;
the predefined duration D for which the successive individual haptic patterns M1, M2, M3 . . . Mn are generated is longer than or equal to 50 milliseconds;
the duration DS of an individual haptic pattern M1, M2, M3 . . . Mn is between 20 and 250 milliseconds;
the peak-to-peak value of the acceleration A of the individual haptic patterns M1, M2, M3 . . . Mn is between 1 G and 4 G; and
the inter-command duration SOA between the start of a control signal S1 and the start of a subsequent control signal S2 is between 20 and 150 milliseconds.

These haptic feedback characteristics make it possible to provide the sensation of depressing the touch surface 2 (along Z). The user has the impression that his or her finger passes into the touch surface 2 further than the small physical movement actually achieved. It is possible to use this effect to simulate the actuation of a push-button, corresponding to a long pressing action.

According to another exemplary application:
the individual haptic pattern M1, M2, M3 . . . Mn is repeated for as long as the finger is in contact with the touch surface 2;
the duration of a control signal S1, S2 generating the individual haptic pattern is between 20 and 60 milliseconds; and
the inter-command duration SOA between the start of a control signal S1 and the start of a subsequent control signal S2 is between 50 and 150 milliseconds.

Provision may also be made, for example, for it to be possible to move a graphical element (widget) around the display device 3 using the finger. Provision may also be made for the driver unit 5 to be configured to drive the haptic feedback module 4 in order to generate haptic feedback in response to pressing in the area of the graphical element. The haptic feedback thus makes it possible to simulate holding the graphical element with the finger while moving it around the screen.

According to another exemplary application:
the individual haptic pattern M1, M2, M3 ... Mn is repeated between three and 10 times;
the peak-to-peak value of the acceleration A of the individual haptic patterns M1, M2, M3 ... Mn is between 3 G and 10 G;
the inter-command duration SOA between the start of a control signal S1 generating an individual haptic pattern and the start of a subsequent control signal S2 is longer than or equal to 20 milliseconds, such as between 50 and 150 milliseconds;
the haptic feedback is generated for a predefined duration D that is longer than or equal to 50 milliseconds; and
the frequency of the individual haptic patterns M1, M2, M3 ... Mn is, for example, between 60 Hz and 400 Hz, such as between 60 and 200 Hz.

This makes it possible to indicate to the user that he or she is performing a forbidden interaction, making an error or performing an impossible action.

The invention claimed is:

1. A control device for an automotive vehicle, comprising:
a touch surface located at a center console of the automotive vehicle comprising a plate bearing a contact sensor that:
  detects a contact on the touch surface,
  identifies a type of the contact,
  determines whether the type of contact is a push pressure, a movement of a finger of a user, or a movement of a stylus of the user, and
  determines a duration of the contact;
a haptic feedback module that vibrates the touch surface, the haptic feedback module comprising a plurality of actuators positioned below the touch surface in a direction inside the center console of the automotive vehicle, and linked to the plate of the touch surface; and
a driver unit that drives the haptic feedback module to generate haptic feedback in response to the type of the contact on the touch surface, the haptic feedback comprising:
  a vibratory signal produced by a plurality of control signals including one or more succession of pulses sent to the plurality of actuators, each of the plurality of control signals generating one individual haptic pattern comprising a magnitude, a frequency, and a duration corresponding to the type of contact,
  a repetition of at least two identical individual haptic patterns generated in succession, and
  a period without haptic feedback, intercalated between two successive individual haptic patterns and determined by the driver unit based on the type of contact and the vibratory signal produced,
wherein the haptic feedback is different and distinct each time the contact on the touch surface is detected.

2. The control device as claimed in claim 1, further comprising: a display device positioned below the touch surface to display a graphical element through the touch surface, wherein the driver unit drives the haptic feedback module to generate haptic feedback in response to the type of the contact in the area of the graphical element.

3. The control device as claimed in claim 1, wherein the duration of a period without haptic feedback is between 10 and 240 milliseconds.

4. The control device as claimed in claim 1, wherein the peak-to-peak value of the acceleration of the individual haptic patterns is between 0.5 G and 15 G.

5. The control device as claimed in claim 1, wherein the frequency of the individual haptic patterns is between 60 Hz and 400 Hz.

6. The control device as claimed claim 1, wherein the haptic feedback is generated for as long as the finger is in contact with the touch surface.

7. The control device as claimed in claim 1, wherein:
the duration of an individual haptic pattern is between 20 and 250 milliseconds;
the peak-to-peak value of the acceleration of the individual haptic patterns is between 10 G and 15 G; and
the inter-command duration between the start of a control signal generating an individual haptic pattern and the start of a subsequent control signal is between 20 and 150 milliseconds.

8. The control device as claimed in claim 7, wherein:
the individual haptic pattern is repeated a minimum of three times;
the haptic feedback is generated for a predefined duration that is longer than or equal to 50 milliseconds.

9. The control device as claimed in claim 1, wherein:
the individual haptic pattern is repeated between three and 10 times;
the peak-to-peak value of the acceleration of the individual haptic patterns is between 3 G and 10 G;
the inter-command duration between the start of a control signal generating an individual haptic pattern and the start of a subsequent control signal is longer than or equal to 20 milliseconds; and
the haptic feedback is generated for a predefined duration that is longer than or equal to 50 milliseconds.

10. The control device as claimed in claim 1, wherein the contact sensor is a pressure sensor selected from the group consisting of force-sensing resistor technology and capacitive technology.

11. The control device as claimed in claim 1, wherein the plurality of actuators positioned below the touch surface are each positioned in different positions and orientations.

12. A control method comprising:
generating a haptic feedback in response to a type of a contact on a touch surface of a control device, the haptic feedback comprising:
  a vibratory signal produced by a plurality of control signals including one or more succession of pulses sent to a plurality of actuators, each of the plurality of control signals generating one individual haptic pattern comprising a magnitude, a frequency, and a duration corresponding to the type of contact,
  a repetition of at least two identical individual haptic patterns, generated in succession, and
  a period without haptic feedback, intercalated between two successive individual haptic patterns and based on the type of contact and the vibratory signal produced,
wherein the touch surface is located at a center console of the automotive vehicle and comprises a plate bearing a contact sensor that:
  detects the contact on the touch surface,
  identifies the type of the contact,
  determines whether the type of contact is a push pressure, a movement of a finger of a user or a movement of a stylus of the user, and
  determines a duration of the contact on the touch surface, and wherein:
the plurality of actuators are positioned below the touch surface and linked to the plate of the touch surface and the haptic feedback is different and distinct each time the contact on the touch surface is detected.

13. The control method as claimed in claim 12, further comprising displaying a graphical element through the touch surface and generating haptic feedback in response to the type of the contact in the area of the graphical element.

14. The control method as claimed in claim 12, wherein the duration of a period without haptic feedback is between 10 and 240 milliseconds.

15. The control method as claimed in claim 12, wherein the peak-to-peak value of the acceleration of the individual haptic patterns is between 0.5 G and 15 G.

16. The control method as claimed in claim 12, wherein the frequency of the individual haptic patterns is between 60 Hz and 400 Hz.

17. The control method as claimed in claim 12, wherein the haptic feedback is generated for as long as the finger is in contact with the touch surface.

\* \* \* \* \*